3,122,440
PROCESSES OF TENDERIZING MEAT USING ANTE-MORTEM ENZYME INJECTION AND POST-MORTEM WATER INJECTION
Beverly E. Williams, La Grange Park, Ill., assignor to Hodges Research and Development Company, New York, N.Y., a corporation of California
No Drawing. Filed May 2, 1961, Ser. No. 107,021
2 Claims. (Cl. 99—107)

This invention relates to processes for tenderizing meat in which the cattle, before slaughter, are injected with an enzyme and after slaughter and while the carcass is still warm and flaccid and before the completion of rigor mortis, is then stitch pumped with water under pressure U.S. Patent No. 2,903,362 to Jack F. Buek et al., dated September 8, 1959, and assigned to Swift and Company, is the basis for the so-called "Swift Pro-Ten" method for tenderizing meat. In accordance with this concept the tenderness of the meat is improved through enzymatic action by introducing a dilute aqueous solution of an enzyme into the vascular system of the animal and then slaughtering the animal within about 24 hours thereafter. Difficulty has been experienced in the practice of this process because if the animal is allowed to stand too long after injection and before slaughter, the liver and kidneys filter out the enzyme and become too soft and mushy for use as food with subsequent economic waste. Further, it has been found that there is a strong tendency for nature to "wall off" the injected fluid and to circulate the injected fluid en masse through the circulatory system. The injected fluid may be surrounded by serums in the blood and these serums prevent diffusion of the enzymes. Enzymes may become blocked in the capillaries of the round or chuck for example. Uniform distribution of enzymes may not be obtained and large quantities of the enzyme concentrate is often found lodged or deposited in certain spots or areas of the carcass after slaughter. Such deposits have been found in the round or in the chuck resulting in a soft or mushy portion of these wholesale cuts if the injected enzyme fluid is allowed to remain without uniform dispersion throughout the meat. Soft or mushy portions often go "off-condition."

I have now found that, if cattle are injected before slaughter with a proteolytic enzyme solution containing approximately 0.5 mg. of enzyme per pound of live weight of the animal in accordance with the Buek et al. procedure and the cattle are then slaughtered, the carcass while still warm and flaccid and before rigor mortis, should be stitch pumped with body-temperature water under pressure of from approximately 30 to 110 pounds per square inch particularly in those areas where large quantities of the enzyme fluid are often deposited. If water with or without acceptable additives in amounts approximating up to 3% by weight of the warm carcass is utilized for injection in these areas by stitch pumping, not only is the enzyme solution dispersed throughout such wholesale cuts of meats the round and the chuck preventing over-tenderization but savings in shrink due to the post-mortem water injection is economically significant.

The difficulties inherent in prior art procedures for ante-mortem injection of proteolytic enzyme fluid are overcome by the present processes and the post-mortem injection of water acts synergistically with the enzyme fluid in the meat to provide uniform tenderization of the meat without over-tenderization in local areas as in the round and in the chuck.

It is therefore the objective of the present invention to provide novel processes for uniformly distributing in an animal carcass after slaughter and while it is still warm and flaccid and before the completion of rigor mortis, a proteolytic enzyme fluid injected ante-mortem into the animal.

The water stitch pumped into the carcass is employed in amounts up to approximately 3% by weight of the warm carcass and is stitch pumped, on or adjacent the killing floor into the carcass or split side of beef particularly into those areas where concentrations of the ante-mortem injected enzyme have been found. In providing uniform distribution of the enzyme and in breaking up the pockets of the enzyme fluid in the tissues, it is desirable to utilize a plurality of parallel needles mounted on a suitable manifold supplying the water or edible liquid under pressure to the needles. The needles should be small and short with the spray holes well up toward the point, and with perhaps five such needles mounted on a single manifold. The needles should be inserted into the muscles across the grain of the meat. With the side of the animal hanging on the killing floor, the muscles then hang vertically and downwardly and the brackets of needles should therefore be inserted at right angles to the muscles. The needles should be about four to six inches in length with from 16 to 18 spray holes per needle so that the water is forced into the muscle bundle fibers rathers than into spaces between the muscles or between the fat and the muscles. A long needle inserted at an angle downwardly into the muscle will often discharge into the area separating muscles and the water will be pumped into that space or between the bone and the muscles. Pockets of fluid will then collect which is most undesirable.

In utilizing the brackets of needles as above described, I have found that water pressures of from 30 to 110 pounds per square inch provide the desired distribution of the water to dilute and disperse the enzyme solution uniformly throughout the muscle bundle fibers. Pressures less than 30 pounds per square inch do not provide adequate or uniform distribution of the enzyme fluid and higher pressures unduly tear, separate and often rupture the muscle bundle fibers.

Preferably, a valve is provided behind each of the manifolds supporting the needles to meter an exact amount of fluid, upon opening the valve, into the carcass with each insertion of the group of needles. For a group of from 4 to 6 needles on a manifold, the amount of fluid for each insertion of the needles will approximate ½ pound. A 200 pound side of meat will therefore require eight insertions or injections of fluid to approximate 2% of the dressed weight. A 400 pound side of meat will therefore require 16 insertions of fluid and a 300 pound side will require 12 insertions of fluid. An injection of 1% or 3% will require correspondingly less or more manifold needle insertions. The thick portion of the carcass, the round, can be pumped from all sides.

The water employed in post-mortem stitch pumping, as above, preferably is elevated to temperatures approximating that of the warm carcass, circa 100° F. It is also within the scope of the present invention to add such salts, phosphates, acids and other chemicals to the water as may improve the dispersing of the water in the meat, and the retention and assimilation of the water by the meat. Flavoring additives may be incorporated in the pumping fluid and lactic acid, ascorbic acid, sodium hexametaphosphate and the like may be included.

In accordance with the present invention, a group of cattle were each injected ante-mortem in the jugular vein, a few minutes prior to slaughter, with about a cupful of a proteolytic enzyme fluid containing papain. After slaughter the cattle were dressed and split on the killing floor. While still warm and flaccid and before completion of rigor mortis, approximately 2% by weight of water under pressure of approximately 70 pounds per square inch was stitch pumped into the sides to be treated, one side only of each cattle being treated, the other side being held as the control side. In some of the tests 1½ ounces of powdered all-protein gelatin was added to the water prior to pumping. The cattle dressed to approximately 300 pounds per side. Twelve insertions of a group of six needles on a single manifold were made with the needles inserted across the grain of the meat. Approximately one half a pound of fluid was injected into the meat for each insertion of the manifold of needles. The treated sides and the corresponding control sides were then placed in a conventional cooler and held for seven days at approximately 35° F. The treated sides were then divided into primal cuts from which steaks and roasts were prepared for organoleptic comparisons with corresponding steaks and roasts from the mate control side.

In every case the fluid injected into the beef post-mortem was found to be uniformly distributed throughout the cuts of meat with no collection of the solution or of water in pockets in the meat. The addition of gelatin contributed to the firmness of the meat upon chilling. Gelatin can be used in the post-mortem injection when no enzymes are in the added water to attack and digest the gelatin. However, when the enzymes are injected ante-mortem in the vascular system, contact is made only in the flushing out of the capillaries, not in the main veins and arteries. The color of the red meat was improved due to the temperature of the water injected into the freshly slaughtered meat. In cutting up the control sides, several areas of over-tenderization were noticed. The meat was soft and mushy in spots, giving evidence of concentrated pre-digestions.

Eating tests by a taste panel, comparing the eating qualities of the treated cuts and those from the corresponding control sides, showed a most unexpected and synergistic result from the use of ante-mortem enzyme injection followed by post-mortem water injection. The uniform dilution and distribution of the enzyme solution caused by the post-mortem water injection plus the action of the water itself in flushing the enzymes out of the capillaries ends by opening the muscle bundle fibers had significantly improved, during the cooking process, the tenderness of the meat. The water added by post-mortem stitch pumping contributed significantly to the juiciness of the meat. The resulting tenderness and juiciness of the meat was, according to the experts, greater than the sum of the results which might have been expected from the ante-mortem enzyme injection alone or from the post-mortem stitch pumping with water under pressure. Steaks from the post-mortem treated sides were more uniform in desirable tenderness, and this is of commercial significance, than mate steaks from the control sides. Roasts and steam-table cuts were not over-tenderized as is often the case with the ante-mortem treatment only. The enzyme concentration was diluted by the water, both in the raw meat and in the cooking process and spread throughout the surrounding area.

In the test discussed above the needles employed were approximately 5 inches long, of small diameter, some with 16 and some with 18 spray holes per needle, the holes being forward on the needles so that all holes become buried in the meat with each insertion.

It should now be apparent to those skilled in the art that the present invention in every way satisfies the objective discussed above.

Changes in or modifications to the above described illustrative procedures of the present concept may now be suggested to those skilled in the art without departing from the present inventive concept. Reference should therefore be had to the appended claims to determine the scope of this invention.

What is claimed is:

1. A method for uniformly improving the tenderness of cooked meat, the steps of injecting the animal ante-mortem in the vascular system with a solution of a proteolytic enzyme containing approximately 0.5 mg. of the enzyme per pound of live weight of the animal, slaughtering and dressing the animal, and then while the carcass is still warm and flaccid and before rigor mortis is completed stitch pumping the carcass with approximately 3% by weight of water at approximately the temperature of the warm meat and at pressures of from approximately 30 to 100 pounds per square inch whereby the muscle bundle fibers are opened and the enzyme solution in the capillary ends is uniformly diluted and distributed throughout the meat for improved functioning of the enzyme during normal aging of the meat and the tenderness of the meat is increased in the cooking process.

2. A method for uniformly improving the tenderness of cooked meat, the steps of injecting the animal ante-mortem in the vascular system with a solution of a proteolytic enzyme containing approximately 0.5 mg. of the enzyme per pound of live weight of the animal, slaughtering and dressing the animal, and then while the carcass is still warm and flaccid and before rigor mortis is completed stitch pumping the carcass with approximately 3% by weight of water at approximately the temperature of the warm meat at pressures of from approximately 30 to 100 pounds per square inch, said water containing approximately 1½ ounce of powdered gelatin, whereby the muscle bundle fibers are opened and the meat after chilling becomes firm and the enzyme solution in the capillary ends is uniformly diluted and distributed throughout the meat for improved functioning of the enzyme during normal aging of the meat and the tenderness of the meat is increased in the cooking process.

References Cited in the file of this patent

UNITED STATES PATENTS

| | | |
|---|---|---|
| 2,805,163 | Williams et al. | Sept. 3, 1957 |
| 2,903,362 | Beuk et al. | Sept. 8, 1959 |
| 2,999,020 | Williams | Sept. 5, 1961 |
| 3,006,768 | Williams | Oct. 31, 1961 |